(12) United States Patent
Gaudiau et al.

(10) Patent No.: US 9,983,046 B2
(45) Date of Patent: May 29, 2018

(54) FLUID TANK

(71) Applicant: TRISTONE FLOWTECH SOLUTIONS (TFS), Carquefou (FR)

(72) Inventors: Ghislain Gaudiau, Ancenis (FR); Sylvain Merour, Vertou (FR); Luc N'kaoua, Nantes (FR)

(73) Assignee: TRISTONE FLOWTECH SOLUTIONS (TFS), Carquefou (FR)

( * ) Notice: Subject to any disclaimer, the term of this patent is extended or adjusted under 35 U.S.C. 154(b) by 38 days.

(21) Appl. No.: 14/782,661

(22) PCT Filed: Apr. 3, 2014

(86) PCT No.: PCT/FR2014/050808
§ 371 (c)(1),
(2) Date: Oct. 6, 2015

(87) PCT Pub. No.: WO2014/167222
PCT Pub. Date: Oct. 16, 2014

(65) Prior Publication Data
US 2016/0054169 A1     Feb. 25, 2016

(30) Foreign Application Priority Data
Apr. 9, 2013   (FR) ..................................... 13 53164

(51) Int. Cl.
*G01F 23/68* (2006.01)
*F01P 11/02* (2006.01)
(Continued)

(52) U.S. Cl.
CPC .......... *G01F 23/683* (2013.01); *F01P 11/029* (2013.01); *F01P 11/18* (2013.01); *G05D 9/12* (2013.01)

(58) Field of Classification Search
CPC ..................................................... G01F 23/683
(Continued)

(56) References Cited

U.S. PATENT DOCUMENTS 4,265,262 A     5/1981   Hotine
4,384,184 A *   5/1983   Alvarez .................. G01F 23/72
                                             200/84 C
(Continued)

FOREIGN PATENT DOCUMENTS

DE      4103523      8/1992
EP      0213414      3/1987

OTHER PUBLICATIONS

International Search Report dated 2014.

*Primary Examiner* — John Fitzgerald
*Assistant Examiner* — Rodney T Frank
(74) *Attorney, Agent, or Firm* — IPSILON USA, LLP

(57) ABSTRACT

A fluid tank (1) of the type comprising at least two fluid-receiving chambers (2, 3) separated from each other by a partition (4), level detection means (5) for detecting the level of fluid in the first chamber (2), level detection means (10) for detecting the level of fluid in the second chamber (3), and signal emission means (20) for emitting a warning signal as a function of the level detected by said level detection means (5, 10). At least a portion of the level detection means (5) for detecting the level of fluid in the first chamber (2) is common to at least a portion of the level detection means (10) for detecting the level of fluid in the second chamber (3).

7 Claims, 5 Drawing Sheets

(51) Int. Cl.
*G05D 9/12* (2006.01)
*F01P 11/18* (2006.01)

(58) Field of Classification Search
USPC .................. 73/290 R, 313, 309, 307, 305
See application file for complete search history.

(56) References Cited

U.S. PATENT DOCUMENTS

| | | | | |
|---|---|---|---|---|
| 4,646,569 A | * | 3/1987 | Cosser | .................. G01F 23/24 |
| | | | | 307/118 |
| 2012/0199229 A1 | * | 8/2012 | Snider | ..................... F15B 1/04 |
| | | | | 138/30 |

* cited by examiner

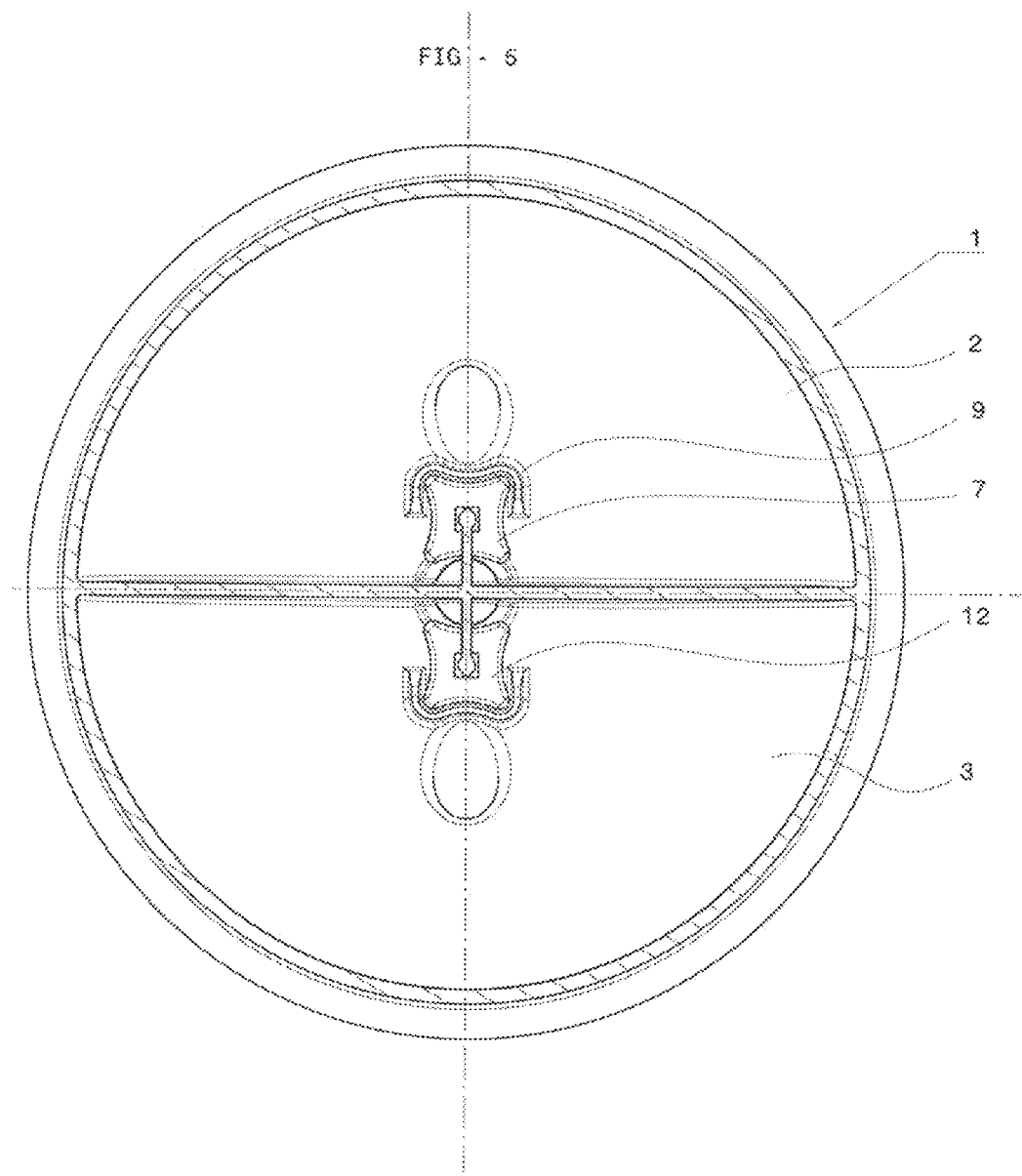

FLUID TANK

RELATED APPLICATIONS

This application is a National Phase Application of PCT/FR2014/050808, filed on Apr. 3, 2014, which in turn claims the benefit of priority from French Patent Application No. 13 53164 filed on Apr. 9, 2013, the entirety of which are incorporated herein by reference.

BACKGROUND

Field of the Invention

The present invention relates to a fluid tank, in particular for a motor vehicle, the fluid tank comprising at least two fluid-receiving chambers separated from each other by a partition, level detection means for detecting the level of fluid in the first chamber, level detection means for detecting the level of fluid in the second chamber, and signal emission means for emitting a warning signal as a function of the level detected by said level detection means.

The invention relates more particularly to a tank of the type having each of its chambers equipped with a fluid inlet and with a fluid outlet, and connectable to a respective fluid flow circuit via its inlet and outlet.

Description of Related Art

Numerous liquid tanks are present in a vehicle. In particular, in the cooling circuit for cooling the engine, a tank is generally provided that provides the functions of acting as a degassing chamber, and as means for filling and for topping up the circuit with liquid coolant.

Such a tank may be compartmented so that one of its compartments is used for the above-mentioned functions, while the other compartment is used for an auxiliary circuit.

Generally, the fluids circulating in the two compartments are at different temperatures. It is therefore necessary for the two compartments not to communicate with each other while the vehicle is running.

Presently, in such tanks, each of the chambers is equipped with its own specific level detection means for detecting the level of its fluid. As a result, the tank has a high cost.

OBJECTS AND SUMMARY

An object of the present invention is thus to propose a fluid tank of the above-mentioned type in which the design of the level detection means makes it possible to reduce the cost of the tank and to reduce the number of parts making up said tank.

To this end, the invention provides a fluid tank of the type comprising at least two fluid-receiving chambers separated from each other by a partition, level detection means for detecting the level of fluid in the first chamber, level detection means for detecting the level of fluid in the second chamber, and signal emission means for emitting a warning signal as a function of the level detected by said level detection means, said fluid tank being characterized in that at least a portion of the level detection means for detecting the level of fluid in the first chamber is common to at least a portion of the level detection means for detecting the level of fluid in the second chamber.

The fact that the level detection means for detecting the level of fluid in the first chamber have at least a portion in common with the level detection means for detecting the level of fluid in the second chamber results in the overall assembly being simplified and of lower cost.

Preferably, each chamber has a predetermined minimum fluid filling level, and said emission means are configured to emit a warning signal when the level of at least one of the chambers is lower than the predetermined minimum fluid filling level of said chamber.

In an embodiment of the invention, the minimum fluid filling level is different from one chamber to the other.

Thus, in spite of the level detection means being partially common to both of said chambers, it is possible to associate each chamber with its own specific minimum filling level, as a function of the constraints and of the characteristics of use of the chamber.

In a variant, the minimum fluid filling level is identical from one chamber to the other.

Preferably, at least a portion of the portion of the fluid level detection means that is common to the level detection means for detecting the levels of fluid in the first chamber and in the second chamber is disposed at the partition for separating said chambers.

Preferably, the emission means for emitting a warning signal include at least one electric member for emitting a sound or light warning signal and a power supply electric circuit for powering said member, and the level detection means for detecting the level of fluid in the first chamber and the level detection means for detecting the level of fluid in the second chamber include open/close control means for opening/closing said circuit.

In an embodiment of the invention, the open/close control means for opening/closing the circuit of the level detection means for detecting the level of fluid in the first chamber include a magnetic floating element disposed in said first chamber and a control switch for directly or indirectly causing opening/closure of the power supply electric circuit for powering the electric member for emitting a warning signal, said switch, which is a switch having two positions, one corresponding to closure of the circuit, and the other corresponding to opening of the circuit, being suitable for going from one position to the other as a function of the position taken up by the floating element in said first chamber, the open/close control means for opening/closing the circuit of the level detection means for detecting the level of fluid in the second chamber include a magnetic floating element disposed in said second chamber and a control switch for directly or indirectly causing opening/closure of the power supply electric circuit for powering the electric member for emitting a warning signal, said switch, which is a switch having two positions, one corresponding to closure of the circuit, and the other corresponding to opening of the circuit, being suitable for going from one position to the other as a function of the position taken up by the floating element in said second chamber, and the switch of the level detection means for detecting the level of fluid in the first chamber and the switch of the level detection means for detecting the level of fluid in the second chamber are formed by a single switch.

In particular, each magnetic floating element is mounted, inside the chamber with which it is associated, to be free to slide along a guide path as a function of the filling level of said chamber, and the switch is disposed at the partition for separating said chambers and is configured to take up one of its positions when each of the floating elements is disposed above the minimum filling level of the chamber with which the floating element is associated, and the other of its positions when at least one of the floating elements is disposed below the minimum filling level of the chamber with which the floating element is associated.

In another embodiment of the invention, the open/close control means for opening/closing said circuit of the level detection means for detecting the level of fluid in the first chamber and the open/close control means for opening/closing said circuit of the level detection means for detecting the level of fluid in the second chamber are common open/close control means, and they comprise:

two electrodes, one of which is disposed in the first chamber and the other of which is disposed in the second chamber, and each of which has an electrically conductive portion suitable for coming into contact with the fluid contained in the associated chamber when the filling level of said chamber is higher than or equal to the minimum filling level of said chamber;

an electrically conductive surface extending from one face to the other of the partition for separating the chambers at a location that is a function of the minimum filling levels of the first and second chambers, and suitable for establishing an electrical connection between said electrodes by means of the electrically conductive fluid for filling the chambers when the filling level of each chamber is higher than or equal to its minimum filling level, said connection being interrupted when the filling level of at least one of the chambers is lower than the minimum filling level of said chamber; and a level detection circuit that is electrically connected to the electrodes and that is suitable for going from the open state to the closed state as a function of whether or not the electrical connection between the electrodes is in the interrupted state.

In particular, said electrodes extend from the bottom towards the top of the tank, and the conductive portion of each of the electrodes is surrounded with dielectric protective cladding that comes to cover the conductive portion partially, the junction between the covered conductive portion and the bare conductive portion corresponding to the minimum filling level of said chamber.

BRIEF DESCRIPTION OF THE DRAWINGS

The invention can be well understood on reading the following description of embodiments given with reference to the accompanying drawings, in which:

FIG. 5 is a cross-section view of the FIG. 3 tank, on a cross-section taken at the level detection means of said chambers.

DETAILED DESCRIPTION

Figure 1:
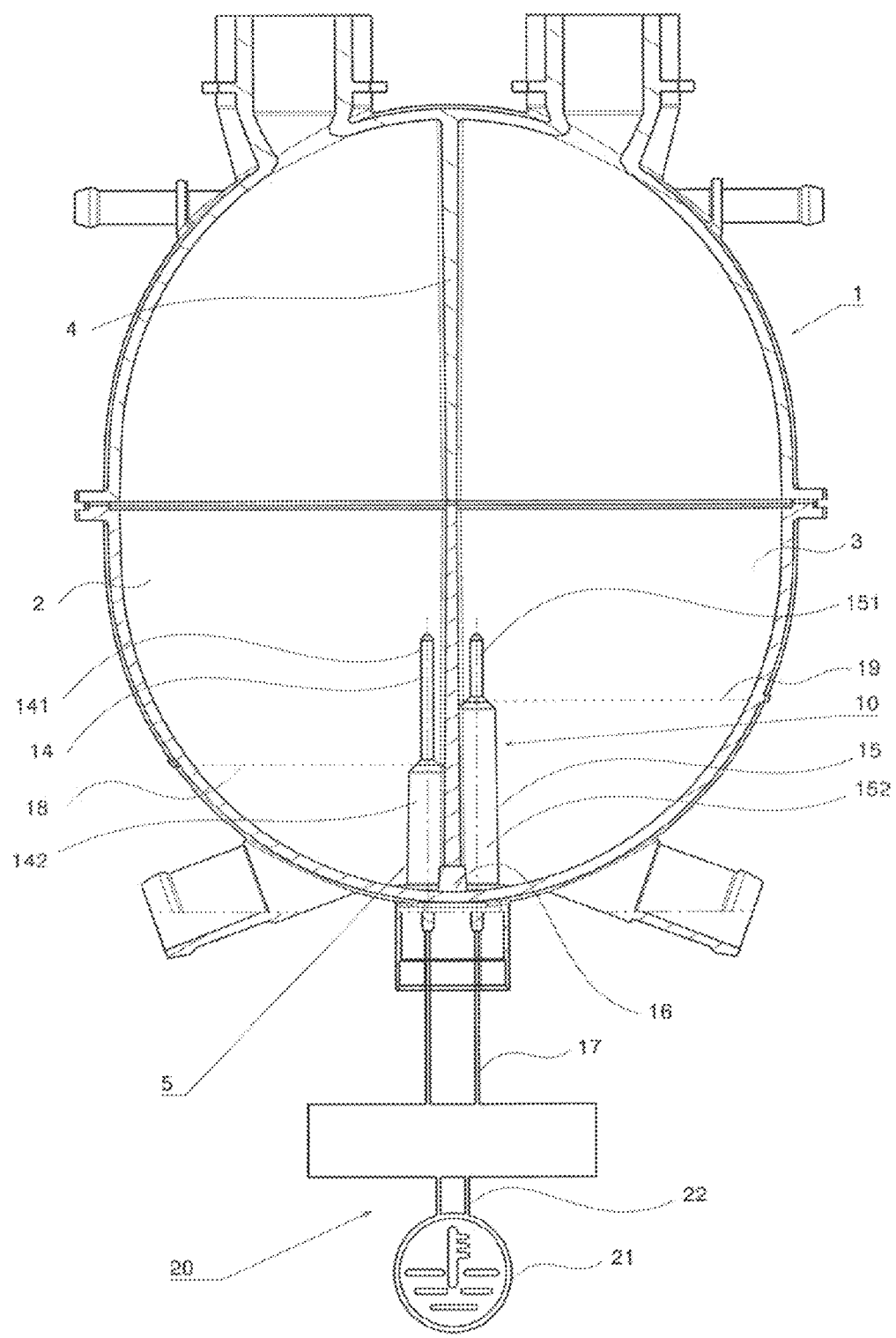
FIG. 1 is a diagrammatic section view of an embodiment of a tank of the invention.

As mentioned above, the fluid tank 1 of the invention comprises two fluid-receiving chambers disposed side-by-side and separated from each other by a partition 4. The first chamber is referenced 2 in the figures, and the second chamber is referenced 3. In this example, each chamber is equipped with a fluid inlet and with a fluid outlet, each of which is connectable to a fluid flow circuit. The inlets of said chambers are disposed in the top portions of the chambers, while the outlets are disposed in the bottom portions of said chambers.

Thus, when the tank is incorporated into a motor vehicle and forms one of the elements of regulator apparatus, one of the chambers can be connected to the cooling circuit of the engine while the other chamber is connected to an auxiliary circuit.

Said tank is a tank made of a synthetic material, and, in this example is made up of two half-shells assembled together via a join plane. A portion of the partition is carried by each half-shell, and, when the two half-shells are in the assembled-together state, the partition extends substantially perpendicularly to said join plane. This partition 4 for forming a separation between said chambers is designed to prevent any fluid contact between said chambers.

The tank 1 also includes level detection means 5 for detecting the level of fluid in the first chamber 2, level detection means 10 for detecting the level of fluid in the second chamber 3, and signal emission means 20 for emitting a warning signal as a function of the level detected by said level detection means 5 and 10.

In a manner characteristic of the invention, the level detection means 5 for detecting the level of fluid in the first chamber 2 include at least a portion that is common to at least a portion of the level detection means 10 for detecting the level of fluid in the second chamber 3.

In the examples shown, each chamber has a predetermined minimum fluid filling level referenced 18 for chamber 2 and 19 for chamber 3, and the emission means 20 are configured to emit a warning signal whenever the level of at least one of the chambers is lower than the predetermined minimum fluid filling level for said chamber.

Figure 3:
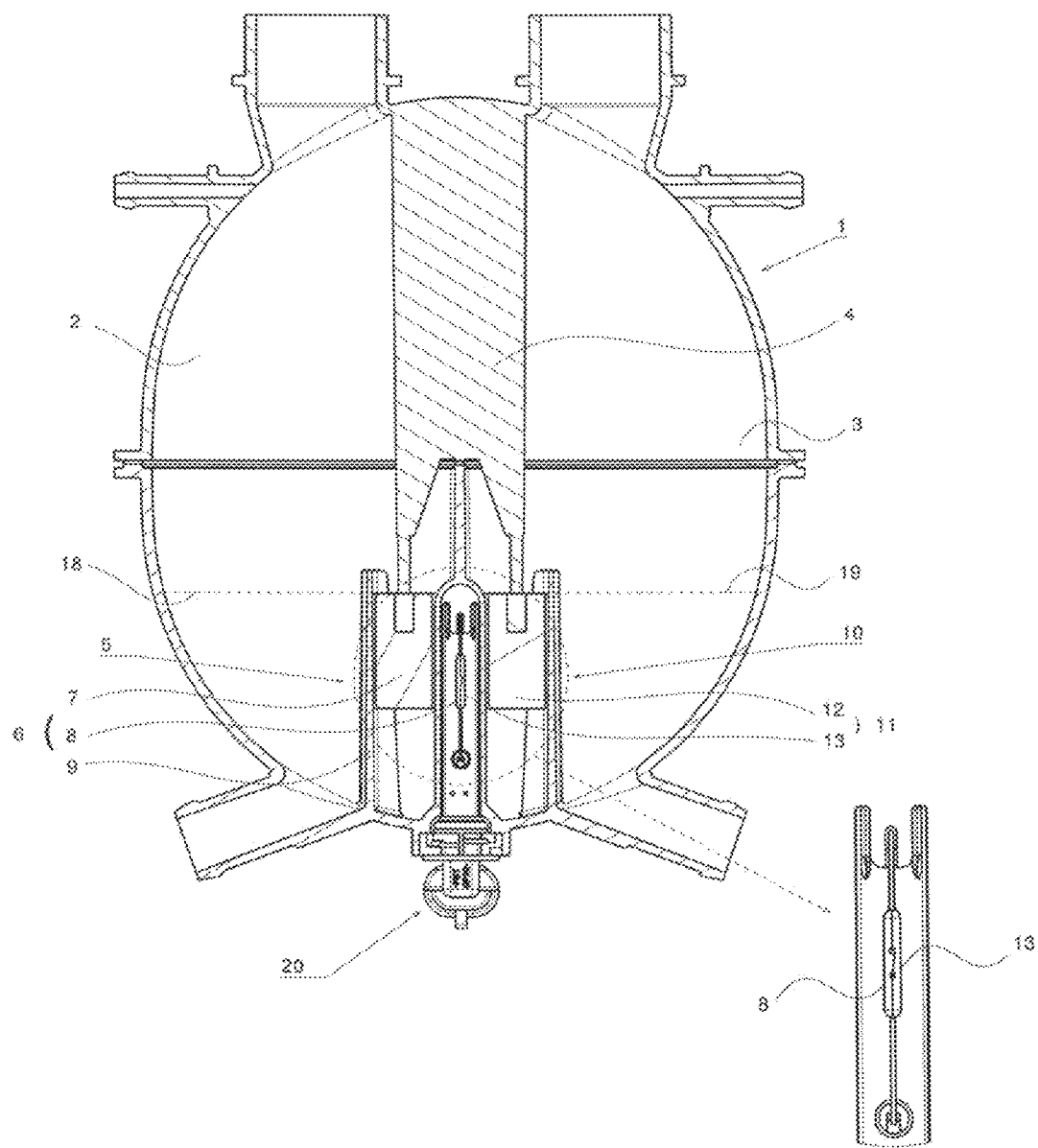
FIG. 3 is a section view of another embodiment of a tank of the invention, with a detail view of a portion of said tank, the tank fluid level of said chambers being higher than a predetermined minimum tank level.

This minimum filling level is predetermined by construction. This filling level may differ from one chamber to the other, as shown in FIG. 1, in which the minimum filling level of the first chamber 2 is lower than the minimum filling level of the second chamber 3, or else it can be identical from one chamber to the other, as shown in FIG. 3.

The emission means 20 for emitting a warning signal include at least one electric member 21 for emitting a sound or light warning signal and a power supply electric circuit 22 for powering said member 21, and the level detection means 5 for detecting the level of fluid in the first chamber 2 and the level detection means 10 for detecting the level of fluid in the second chamber 3 include open/close control means for opening/closing said circuit 22.

This open/close control for opening/closing said circuit 22 may take place either directly or indirectly, without going beyond the ambit of the invention. Thus, the open/close control means for opening/closing the circuit may cause a first circuit to open or to close, the first circuit in turn, by emitting signals or by some other means, causing a second circuit to open or to close, which second circuit may be formed by the power supply circuit 22 for powering the emission member for emitting a warning signal.

The emission member for emitting a warning signal may be an indicator light, a sound signal emitter, or some other means.

Figure 2:
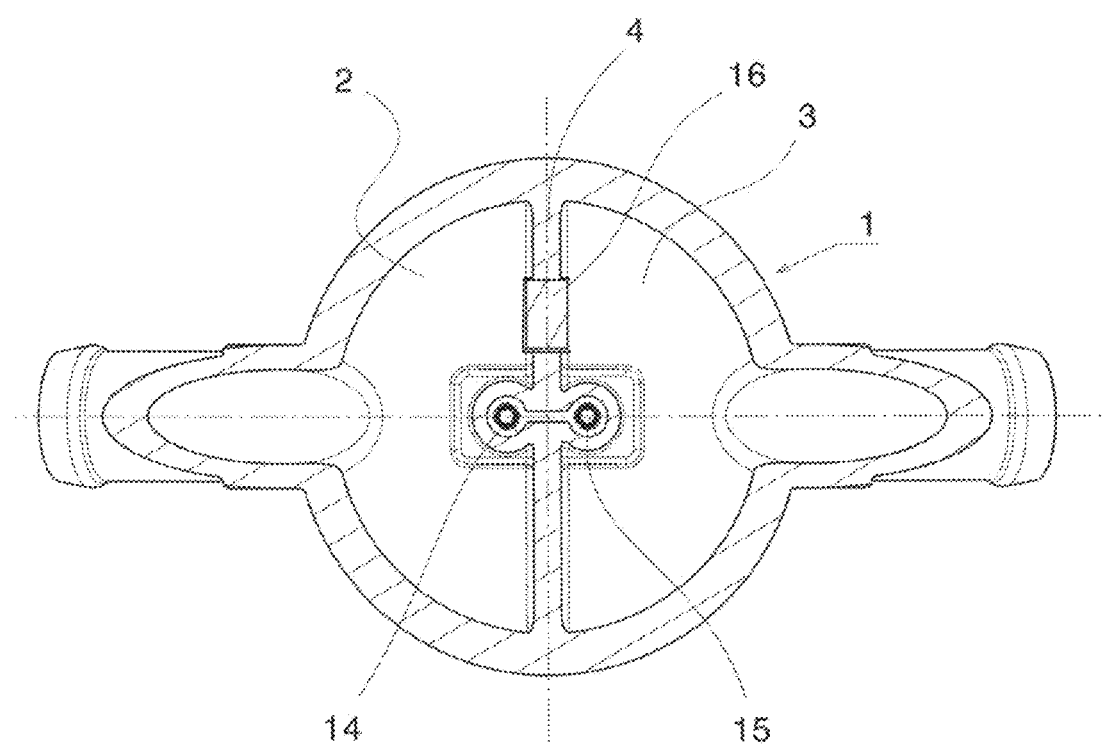
FIG. 2 is a cross-section view of the FIG. 1 tank, on a cross-section taken at the electrodes.

In the example shown in FIGS. 1 and 2, the open/close control means for opening/closing said circuit of the level detection means 5 for detecting the level of fluid in the first chamber 2 and the open/close control means for opening/ closing said circuit 22 of the level detection means 10 for detecting the level of fluid in the second chamber 3 are common open/close control means.

Said open/close control means include two electrodes. One of the electrodes, referenced 14, is disposed in the first chamber 2, and the other electrode, referenced 15, is disposed in the second chamber 3.

Each of these electrodes 14, 15 has an electrically conductive portion 141, 151 suitable for coming into contact with the fluid contained in the associated chamber when the filling level of the chamber is higher than or equal to the minimum filling level of said chamber.

In the examples shown, the electrodes 14; 15, which are of different electric potential, extend from the bottom towards the top of the tank, and each conductive portion is implemented in the form of a metal pin.

In addition, in its conductive portion 141; 151, each electrode 14; 15 is covered with dielectric protective cladding 142; 152 that comes to cover the conductive portion partially. The junction between the covered conductive portion and the bare conductive portion corresponds to the minimum filling level of said chamber.

Thus, in the example shown in FIG. 1, the minimum filling level 18 for the fluid in the first chamber 2 is lower than the minimum filling level 19 for the fluid in the second chamber 3. However, the electrodes have conductive portions that are of the same height.

The control means for opening said circuit also include an electrically conductive surface 16 that extends from one face to the other of the partition 4 for separating the chambers, at a location that is a function of the minimum filling levels of the first and second chambers.

This surface 16 may be formed merely by a metal plate incorporated into the partition 4 of the tank, which partition is made of a synthetic material. In this example, this electrically conductive surface 16 extends from the base of the partition to a height lower than the minimum filling level of each of the chambers. This electrically conductive surface 16 is disposed in a manner such that it is laterally offset relative to the location occupied by the electrodes, as shown in FIG. 2.

The open/close control means for opening/closing said circuit also include level detection circuit 17 that is electrically connected to the electrodes 14, 15 and that is suitable for going from the open state to the closed state as a function of whether or not the electrical connection between the electrodes 14, 15 is in the interrupted state.

In the example shown, the base of each electrode projects from the tank and is connected to said detection circuit 17. In this example, the detection circuit 17 is shown as being common to the power supply electric circuit 22 for powering the electric member 21 for emitting a warning signal, so that interruption of the electrical connection between the electrodes due to a filling level lower than the minimum level for the liquid in one of the chambers opens the circuit and generates emission of a warning signal, e.g. extinction of the light signal.

As mentioned above, the circuits 17 and 22 may be distinct without going beyond the ambit of the invention, the circuit 17 being suitable for transmitting a control signal to the electric circuit 22.

The detection means as described above operate as follows: each tank chamber is filled with electrically conductive fluid, e.g. with water or with an aqueous solution, such as a glycol-containing aqueous solution, to a level higher than the minimum filling level of the chamber.

The electrical connection between the electrodes is established via the electrically conductive surface 16.

When the level of fluid in one of the chambers goes below the minimum filling level of the chamber, which minimum level is embodied, in this example, by the base of the conductive portion of the electrode, the electrical connection between the electrodes is interrupted and the detection circuit 17 makes it possible to detect such an interruption in order to enable the electric circuit 22 of the emission means 20 for emitting a warning signal to be operated.

Figure 4:
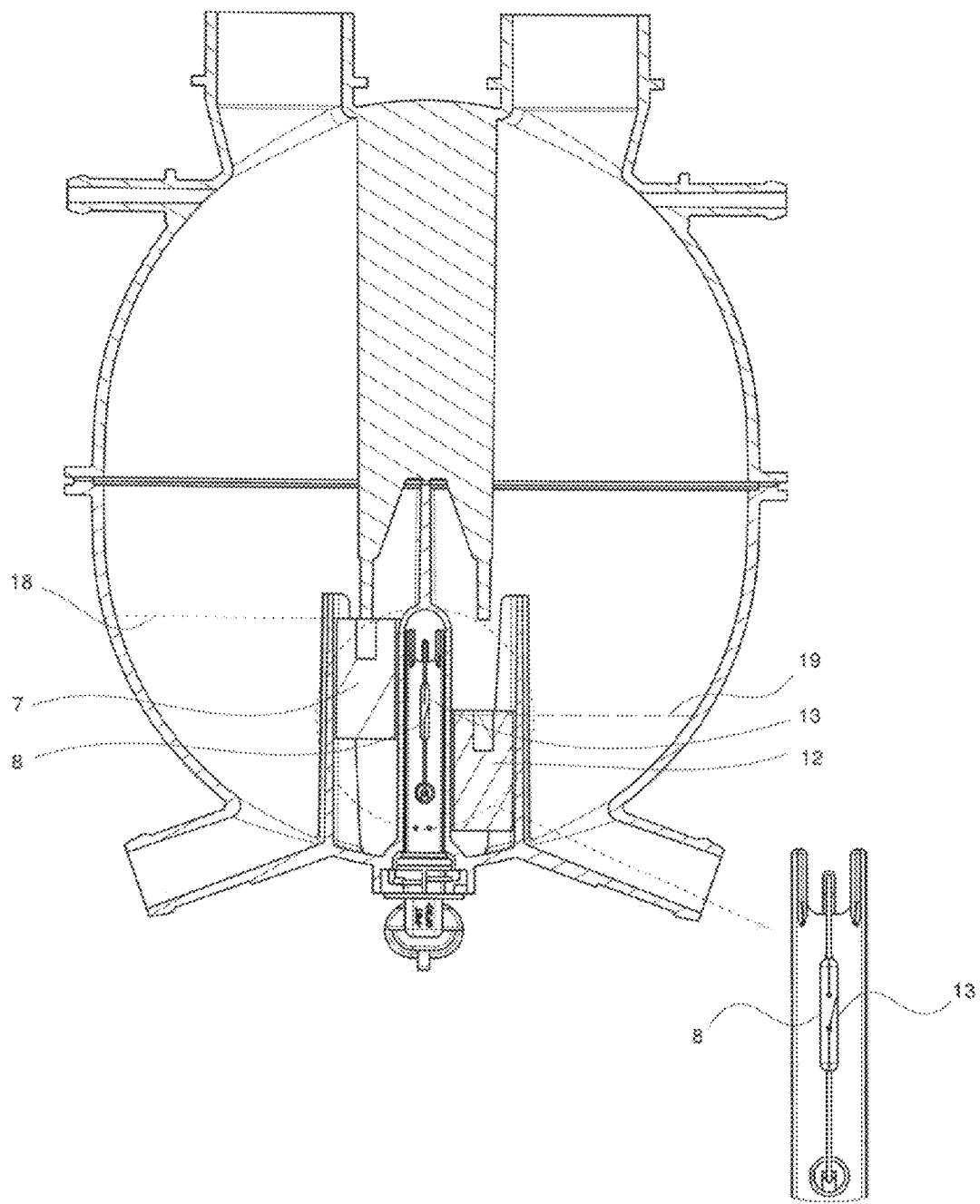
FIG. 4 is a diagrammatic section view of the FIG. 3 tank, with a detail view of a portion of the tank, the level of one of the chambers of the tank being lower than a predetermined minimum filling level.

In another embodiment of the invention that is shown in FIGS. 3 to 5, the open/close control means 6 for opening/closing the circuit of the detection means 5 for detecting the fluid level of the first chamber 2 include a magnetic floating element 7 disposed in said first chamber 2, and a control switch 8 for directly or indirectly causing opening/closure of the power supply electric circuit 22 of the electric member 21 for emitting a warning signal.

Said switch 8 is a switch having two positions, one of which corresponds to closure of the circuit 22, and the other of which corresponds to opening of the circuit 22. This switch 8 is suitable for going from one position to the other as a function of the position taken up by the floating element 7 in said first chamber 2.

In similar manner, the open/close control means 11 for opening/closing the circuit of the detection means for detecting the fluid level of the second chamber 3 include a magnetic floating element 12 disposed in the second chamber 3, and a control switch 13 for directly or indirectly causing opening/closure of the power supply electric circuit 22 of the electric member 21 for emitting a warning signal. This switch 13 has two positions, one corresponding to closure of the circuit 22, and the other corresponding to opening of the circuit 22, and it is suitable for going from one position to the other as a function of the position taken up by the floating element 12 in the second chamber 3.

The switch 8 of the detection means 5 for detecting the level of fluid in the first chamber 2 and the switch 13 of the detection means 10 for detecting the level of fluid in the second chamber 3 are formed by a single switch.

Each magnetic floating element 7, 12 is mounted, inside the chamber with which it is associated, to be free to slide along a guide path, as a function of the filling level of said chamber. The switch 8, 13 is disposed at the partition 4 for separating said chambers, and it is configured to take up one of these positions when each of the floating elements 7 and 12 is disposed above the minimum filling level 18, 19 of the chamber 2, 3 with which it is associated, and to take up the other of its positions when at least one of the floating elements 7, 12 is disposed below the minimum filling level 18, 19 of the chamber 2, 3 with which it is associated.

For each chamber, the minimum filling level of said chamber is defined by construction and corresponds to the filling level above which movement of floating element generated by additional filling of said chamber is suitable for causing the switch to change position. This minimum filling level may be modified by the magnet changing position relative to the floating element.

In the examples shown, the guide path 9 of each floating element is formed merely by rails formed by molding inside said chambers while the tank is being manufactured.

Similarly, the floating element that carries a magnet is made of a foam, preferably polyethylene foam.

In the example shown, each magnet is configured to exert a repulsion force or an attraction force on the switch when the floating element carrying the magnet is disposed below the minimum filling level of the chamber with which it is associated.

The invention claimed is:

1. A fluid tank comprising:
   at least two fluid-receiving chambers separated from each other by a partition,
   a first level detection electrode for detecting the level of fluid in the first chamber,
   a second level detection electrode for detecting the level of fluid in the second chamber, and
   signal emission means for emitting a warning signal as a function of the level detected by said level detection electrodes,
   wherein the first level detection electrode for detecting the level of fluid in the first chamber is electrically connected with the second level detection electrode for detecting the level of fluid in the second chamber by a common conductive component, said common component being a conductive surface disposed in said partition that separates said first and second chambers.

2. The tank according to claim 1, wherein each of said chambers have a predetermined minimum fluid filling level, and in that said emission means are configured to emit a warning signal when the level of at least one of the chambers is lower than the predetermined minimum fluid filling level of said chamber.

3. The tank according to claim 2, wherein the minimum fluid filling level is identical from one chamber to the other.

4. The tank according to claim 2, wherein the minimum fluid filling level is different from one chamber to the other.

5. The tank according to claim 1, wherein the emission means for emitting a warning signal include at least one electric member for emitting a sound or light warning signal and a power supply electric circuit for powering said member, and in that the first level detection electrode for detecting the level of fluid in the first chamber and the second level detection electrode for detecting the level of fluid in the second chamber include open/close control means for opening/closing said circuit.

6. The tank according to claim 5, wherein each chamber has a predetermined minimum fluid filling level, and in that said emission means are configured to emit a warning signal when the level of at least one of the chambers is lower than the predetermined minimum fluid filling level of said chamber, and
   wherein said open/close control means for opening/closing said circuit of the first level detection electrode for detecting the level of fluid in the first chamber and the open/close control means for opening/closing said circuit of the second level detection electrode for detecting the level of fluid in the second chamber are common open/close control means, and they comprise:
   said electrodes each having an electrically conductive portion suitable for coming into contact with the fluid contained in the associated chamber when the filling level of said chamber is higher than or equal to the minimum filling level of said chamber;
   said electrically conductive surface that electrically connects said first level detection electrode and said second level detection electrode extends from one face to the other of the partition for separating the chambers at a location below the minimum filling levels of the first and second chambers, and suitable for establishing an electrical connection between said electrodes by means of the electrically conductive fluid for filling the chambers when the filling level of each chamber is higher than or equal to its minimum filling level, said connection being interrupted when the filling level of at least one of the chambers is lower than the minimum filling level of said chamber; and
   a level detection circuit that is electrically connected to the first and second electrodes and that is suitable for going from the open state to the closed state as a function of whether or not the electrical connection between the electrodes is in the interrupted state.

7. The tank according to claim 6, wherein said first and second electrodes extend from the bottom towards the top of the tank, and in that the conductive portion of each of said electrodes is covered with dielectric protective cladding that comes to cover the conductive portion partially, the junction between the covered conductive portion and the bare conductive portion corresponding to the minimum filling level of said chamber.

* * * * *